Aug. 30, 1955   J. E. BOICE   2,716,353
MOTOR MOUNTINGS
Filed Oct. 20, 1952
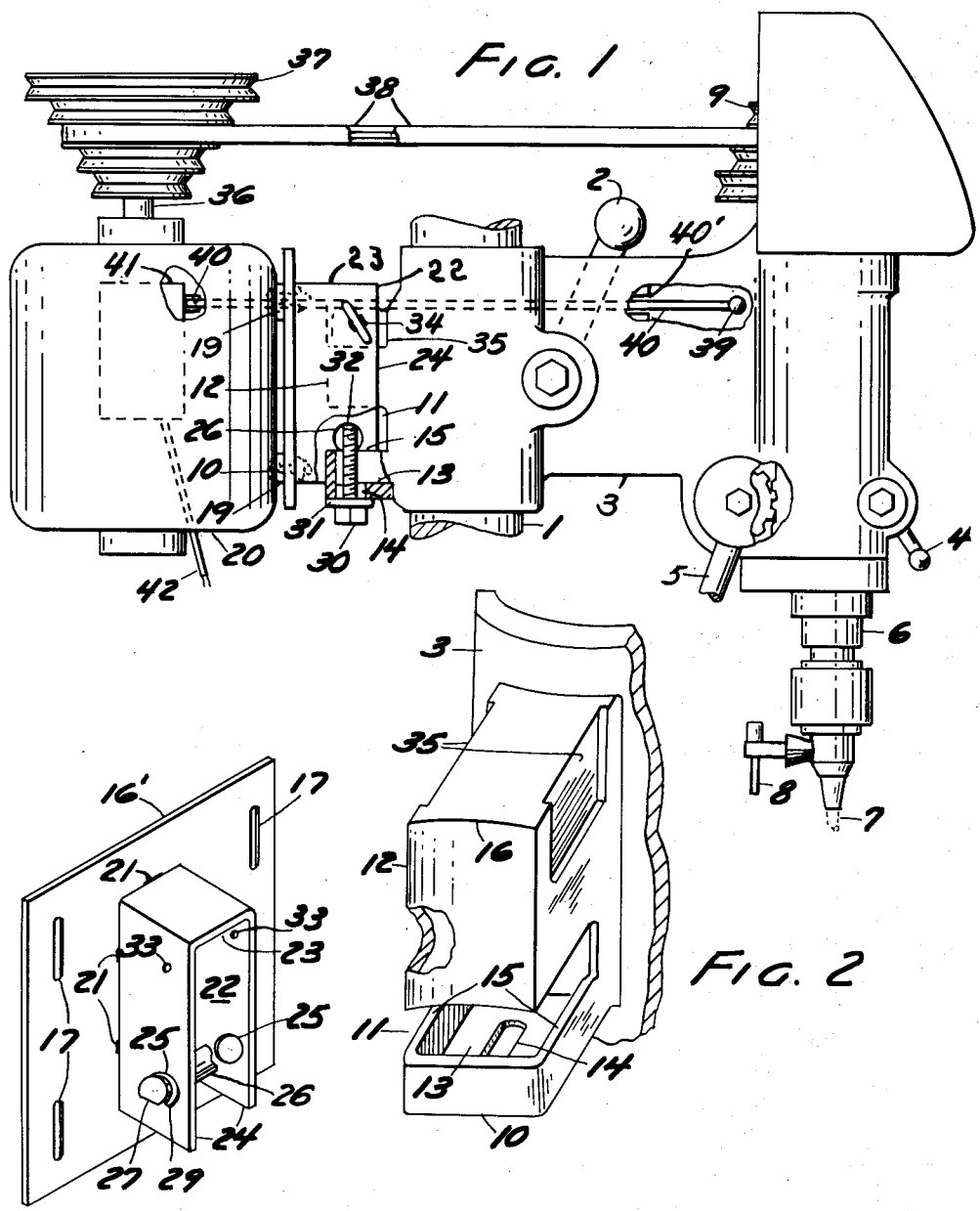
Inventor
JOHN E. BOICE
By
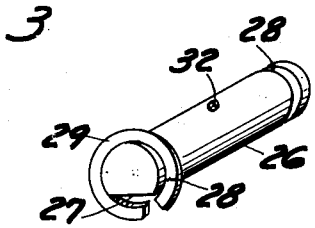
Attorney

United States Patent Office 2,716,353
Patented Aug. 30, 1955

2,716,353

MOTOR MOUNTINGS

John E. Boice, Toledo, Ohio, assignor to Boice-Crane Company, Toledo, Ohio, a corporation of Ohio Application October 20, 1952, Serial No. 315,605

4 Claims. (Cl. 74—472)

This invention relates to readily adjustable and compensation-adaptable transmission support and connections.

This invention has utility when incorporated in a slidable and rockable supporting connection for a vertical axis motor to the frame of a tool. An instance being that of a drill press and a belt drive stepped pulley system of V-belt type for variable speed readily adaptable to maintain an appropriate tension for the belt in the system, regardless of the pulley steps being used and belt stretch.

Referring to the drawings:

Fig. 1 is a side elevation, with parts broken away, of an embodiment of the invention in the mounting of the power motor on a machine tool frame;

Fig. 2 is a fragmentary perspective view of a portion of the machine tool frame, having basic bracket portion specially configured to assemble the motor therewith;

Fig. 3 is a perspective view of a motor base extension bracket complementary to the tool frame bracket, for the flexible assembly therewith on a lesser scale than Fig. 2; and Fig. 4 is a perspective view of the main motor load carrying pin or pivot in the joint portion of the assembly between the frame bracket and the motor base extension bracket.

The machine tool instance for the mounting herein taken is of a drill press having from its base or pedestal passing upward from its work table, a fixed shaft 1 along which, by means of a clamp actuating arm 2, there may be vertically adjusted a frame 3. As released by a clamp arm 4, an arm 5 may adjust up and down a shaft 6 in the frame 3. There is thus provided means for locating a rotary tool 7 as set by a clamp 8 to be driven by the shaft 6. Also fixed with the shaft 6 upward from the frame 3 is a V-belt coacting stepped pulley 9.

The frame 3, in its extent from the shaft 1 oppositely from toward the shaft 6, has a lower open top box region 10, spaced by an open slot or notch portion 11 from an open bottom box portion 12. The box 10 has a bottom 13 in which is a slot 14 parallel to box top edges 15. The box 12 has a closed top 16 slightly convex, which may provide a seat. The boxes 10, 12, are integral with the frame 3, in a current embodiment being of cast iron.

A base plate 16' has slots 17 for bolts 18 to extend thru feet 19 of a motor 20. Welds 21 mount on inverted U-section 22 rigidly with the plate 16'.

In the assembly, this U-section 22 is complementary to the pair of boxes 10, 12, and is adapted to ride thereover, with U-cross over portion 23 in proximity to the upper box top 16. Parallel legs 24 of the U-section 22, ride against the sides of the boxes 10, 12, and across the slot 11. Aligned openings 25 in the legs 24 position a pivot pin 26 to have its flat side 27 ride on seats or edges 15 at the lower portion of the slot 11. Upon insertion of the pin 26 thru the openings 25 it protrudes at each end beyond the legs 24, and there has grooves 28 to receive split spring rings 29, thus holding the pin 26 from shifting axially.

On a bolt 30 is a washer 31. The bolt 30 is thrust upward thru the slot 14 to have the washer 31 ride against the lower side of the slot 14, while the upper exteriorly threaded portion of the bolt 30 enters internally threaded opening 32 in the pin 26 to draw the flat side 27 of the pin 26 to be frictionally held against the two top edges 15 of the box 10.

Parallel to the openings 25 in the legs 24 of the U-section 22, and toward the cross-over 23 is an aligned pair of internally threaded openings 33. In each of the openings 33 is a wing bolt 34 adjustable for end tips thereof frictionally to grip inwardly offset face portions 35 of the box 12 opposite sides.

The motor 20 has a vertical shaft 36 with which is fixed a stepped pulley 37 in reverse step sequence to that of the pulley 9. A transmission effecting V-belt 38 as about the largest diameter portion of the pulley 9 is preferably about the smallest diameter step portion of the pulley 37. As so located the reaches of the belt 38 are horizontal.

Upon location of the belt 38 for transmission of the desired speed of rotation to the driven shaft 6, an appropriate spacing setting between the parallel axis of the shaft 36 and of the shaft 6 is adopted for the belt to be in efficient gripping relation to the pulleys in efficient transmission operation. In practice the driven speed may vary as much as ten to one, with an intermediate speed approximating one to one ratio as to the speed of the shaft 9 from the shaft 36. Upon location of the appropriate spacing, achieved by loosening the bolt 30 and the wing bolts 34, to have the shaft 36 axially parallel to the shaft 6, the bolt 30 is tightened frictionally to bind the pin 26 flat side 27 with the top edges 15, and thus fix the free edges of the legs 25 of the U-section as away from the plate 16' in vertical and thus parallel to the shaft 6. Inasmuch as the pin 26 is really a fulcrum or pivot bearing for the motor 20, the vertical direction for the shaft 36 is stabilized by tightening the pair of wing bolts 34 into frictional holding relation with the countersunk face portions 35 of the box 12. The operation condition as thus established is firmly held against wobble or motor vibration.

In the event there be occasion to take up or release slight tension in the belt 38, the wing bolts 34, may be slacked off and reset at the new adjustment, with the slight resulting out-of-vertical for the shaft 36 not sufficient to detract from the transmission efficiency for the belt 38.

A material factor of advantage has to do with the convenience for change-speed adjustment by shifting the V-belt 38 from one step, say to a larger diameter on the pulley 37 and a lesser diameter adjacent step on the pulley 9. This course to build up the R. P. M. of the driven shaft 6 is effected by loosening the wing bolts 34, in the normal practice. The hinge pin 26 is thus an axis for swinging of the motor 20 for the shaft 36 upper end to be inclined toward the pulley 9 sufficiently for the belt 38 to be slack enough to clear the groove in the pulley 37 and, as the other portion is moved to the lesser diameter step on the pulley 9, the belt 38 may be placed on the larger diameter step of the pulley 37. Usually this change, at proper taut condition for the belt 38, brings the shaft 36 to a true vertical for the wing bolts 34 to be tightened against the faces 35, and the transmission thus in proper operation assembly.

There may be occasion for a less rapid change-over, say for substitute belts, or otherwise. Upon such a basis, the bolt 30 is released, as well as the bolts 34. By locating the shaft 36 vertical, the telescopic assembly relation of the U-section 22 over the box pair 10, 12, as toward or away from the shaft 1, may be changed for the pin 26, flat side 27 to ride at a different seat relation with the edges 15. The flat side 27 and the bolt 30 lock the pin 26 for the legs 24 to rock thereon. As the re-positioning of the pin 26 locates the shaft 36 vertically, the bolt 30 is tightened, thus fixing the fulcrum. Then the bolts 34 are each tightened.

It is to be noted that in the proper transmission relation, the motor 20 is fixed against any wobble or shifting relatively to the driven shaft 6 or the mounting frame 3. The wing bolts 34 provide quick adaptation to release the motor 20 to swing on the fulcrum 26, as occasion therefor may arise, especially if belt tension adjustment or speed change be desired.

The seat 15 is a pair of parallel co-planar faces extending radially from the fixed shaft 1 along which the frame 3 is adjustable, as well as radially from the shaft 6. The plane thru the axis of the shaft 6, thru the axis of the shaft 1 to lie therein, is a plane perpendicular to the axis of the pin 26.

The flexibility for the motor mounting has its full range adequately cared for, independently of the power supply to the motor requiring any special hook-up to the frame. This feature is carried thru by means of locating a handle 39 in proximity to the machine operator giving attention to the operation of the tool 7, and thus adjacent the shaft 6. From the hand grip or knob 39 extends a rod 40, having sufficient play in guide means 40' along the frame 3. The rod 40 has connection into the push-button providing switch box 41 fixed with a side of the motor 20. The play or looseness of the rod 40 in the guide 40' is ample to permit normal tilting of the motor 20, even in the change-speed adjustment stages. With the two-clamping-means set-up disclosed for the motor, there may be the push or pull for putting the motor on or shutting it off, without such effecting any tilt response by the motor.

What is claimed and it is desired to secure by Letters Patent is:

1. A machine tool frame, a vertical axis driven shaft mounted in the frame, a motor having a base with a rigid extension, a vertical drive shaft actuated by the motor, a transmission including belt connection having reach portions between the shafts, said frame having fixed therewith a seat extending radially from the axis of the driven shaft, a pivot pin engaging the extension and adjustable along the seat toward and from the driven shaft with the pin axis perpendicular to the plane of the driven shaft axis and extending to the pin, said pin being positionable to select appropriate taut condition for the belt reach portions with the shafts parallel, and clamp means coacting between the seat and extension and there adjustable independently of the pivot pin to hold the shafts in parallel against disturbance.

2. A machine tool frame, a vertical axis driven shaft mounted in the frame, a motor having a base with a rigid extension, a vertical drive shaft actuated by the motor, a transmission including belt connection having reach portions between the shafts, said frame having fixed therewith a seat extending radially from the axis of the driven shaft, a pivot pin engaging the extension and shiftable along the seat toward and from the driven shaft, first clamp means to lock the pin with the seat in providing an axis on which the motor is tiltable in a plane toward and from the driven shaft to select appropriate taut condition for the belt reach portions, and second clamp means coacting directly between the motor base extension and said seat fixed with the frame to lock the shafts spaced in the selected taut condition for the belt reach portions.

3. A machine tool frame, a vertical axis driven shaft mounted in the frame, a motor having a base with a rigid extension fixed with the motor, a vertical drive shaft actuated by the motor, stepped-pulley-providing variable speed transmission including belt connection having reach portions between the pulleys, said frame having fixed therewith a pair of planar seats extending away from and parallel to a radius of the driven shaft, a pivot pin adjustable along the seats toward and from the driven shaft to select appropriate taut condition for the belt reach portions with first clamp means coacting through the motor base extension to lock the motor base to tilt relatively to the frame on the fixed pin as an axis, and second clamp means lockable between the base extension and frame spaced from said seats to preclude tilting of the motor relatively to the frame, said second clamp means being readily releasable for the motor to tilt to respond to belt connection slacking for change-speed shifting to different steps of the pulleys in effecting speed change at relocking of the second clamp means.

4. A machine tool frame, a vertical axis driven shaft mounted in the frame, an electric motor having a base with a rigid extension, a switch mounted on the motor, a vertical drive shaft actuated by the motor, an electric current supply directly to the motor independently of the frame, a transmission between the shafts including an endless belt, said frame having fixed therewith a seat extending radially from the axis of the driven shaft, a pivot pin mounting for the motor base extension and adjustable along the seat toward and from the driven shaft, clamp means spaced from the pivot pin and independently adjustable to hold the shafts in selected fixed parallel relation therebetween, and a push rod in proximity to the driven shaft, movably mounted upon the frame to leave the motor free for adjustment relatively to the frame, said push rod having connection to operate the switch.

References Cited in the file of this patent

UNITED STATES PATENTS

| 1,879,878 | Leyvastre | Sept. 27, 1932 |
| 2,176,572 | Hedgpeth | Oct. 17, 1939 |
| 2,369,905 | Page | Feb. 20, 1945 |